Patented Jan. 17, 1950

2,495,014

UNITED STATES PATENT OFFICE 2,495,014

ANTHRAQUINONE THIOXANTHONE DICARBAZOLES

Fritz Max, Easton, Pa., and David I. Randall, Phillipsburg, N. J., assignors to General Aniline & Film Corporation, New York, N. Y., a corporation of Delaware No Drawing. Application December 5, 1946, Serial No. 714,148

1 Claim. (Cl. 260—316)

The present invention relates to vat dyes of the anthraquinone series and particularly to dyes of the anthraquinone thioxanthone dicarbazole type. It is known that thioxanthone and its simply substituted derivatives such as, for example, those containing chlorine are of little or no utility as dyestuffs. This is attributable to the fact that they are weakly colored products and have very little affinity for textile fibers (see German Patents 243,587 and 231,854).

It has been proposed that these defects be overcome by reacting thioxanthone and its derivatives with anthraquinones. For example, in German Patent 231,854, 1-amino-5.6-anthraquinone thioxanthone is condensed with α-chloranthraquinone. By this condensation, the amino group in the 1-position of the thioxanthone is substituted by an anthraquinone molecule. It is emphasized, however, in the corresponding United States Patent 999,785, that these compounds dye cotton in shades ranging from red to grayish blue.

There has been a demand in the art for some time for dyestuffs which are capable of dyeing textile fibers, particularly vegetable fibers, in pleasing brown shades. In U. S. P. 2,238,209, a method is disclosed for producing anthraquinone acridone dicarbazole dyes by condensing, for example, 1.5-diamino anthraquinone with 3'.6'-dichloranthraquinone - 2.1-N-1'.2'-N-benzacridone and the intermediate with 1-chloro-5-benzoylamino anthraquinone and ring closing the resulting product. It was pointed out, however, that the dyestuffs thereby obtained dye fibers from a hydrosulfite vat in shades which are primarily yellow brown to olive brown.

We have now discovered a class of vat dyes of the anthraquinone thioxanthone dicarbazole series which are capable of dyeing fibers, particularly vegetable fibers, from a hydrosulfite vat in very pleasing strong shades ranging from black-brown to currant.

It is accordingly an object of the present invention to provide a class of anthraquinone thioxanthone dicarbazole vat dyes.

It is a further object of the present invention to provide a class of vat dyes capable of dyeing vegetable fibers from a hydrosulfite vat in strong pleasing shades ranging from black-brown to currant.

Other and further important objects will become apparent as the description proceeds.

The new dyestuffs which are contemplated by the present invention may be typified by the following structural formulae:

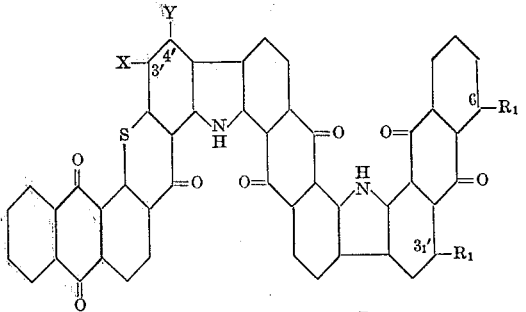

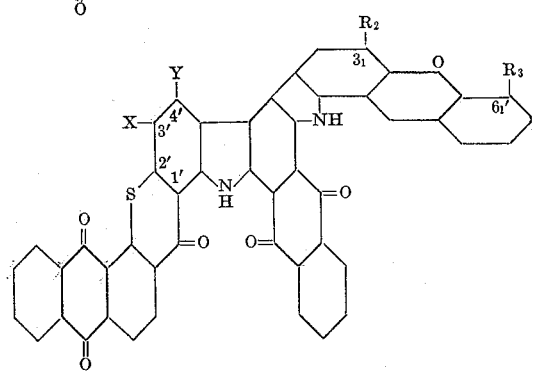

wherein X and Y represent hydrogen, halogen such as chlorine, bromine and the like, alkyl such as methyl, ethyl, propyl, butyl and the like, aromatic such as aryl, i. e., phenyl, naphthyl and the like, aryloxy such as phenoxy and the like, alkylaryl such as o- or -p-methyl phenyl, p-ethylphenyl and the like, aroylamino such as benzoylamino, p-methylbenzoylamino, p-methoxybenzoylamino and the like, alkoxy such as methoxy, ethoxy, propoxy and the like, and R, R₁, R₂, and R₃ represent hydrogen, amino, alkyl as above, alkoxy as above, or aromatic as above.

The new compounds are obtained by condensing a 6'-halogen anthraquinone thioxanthone with a 1.5'- or 1.4-diaminoanthraquinone followed by further condensation with a 1-halogen-anthraquinone. The resulting product is then subjected to ring closure for the purpose of forming in the compound the 2-carbazole rings possessed thereby. Suitable 6'-halogen-anthraquinone thioxanthones for the condensation are:

6'-chloroanthraqinone thioxanthone
3'.6'-dichloroanthraquinone thioxanthone
3'.4'.6'-trichloroanthraquinone thioxanthone
3'-methyl-6'-chloroanthraquinone thioxanthone
3' - methoxy - 6'-chloroanthraquinone thioxanthone
3'-phenyl-4'.6'-dichloroanthraquinone thioxanthone
4' - methoxy - 6'-chloroanthraquinone thioxanthone
3'.4'-dimethyl-6'-chloroanthraquinone thioxanthone
3' - phenoxy - 6' - chloroanthraquinone thioxanthone, and the corresponding brom derivatives and the like.

The 1-chloroanthraquinones which may be condensed with the condensation product of the chloroanthraquinone thioxanthone and the diamino anthraquinone preferably contain substituents in the 4- or 5-position, although valuable dyestuffs are also obtained when the 1-chloroanthraquinones bear no substituents in the indicated positions. As examples of satisfactory 1-chloroanthraquinones, reference may be made to 1-chlor-5-benzoylamino anthraquinone
1-chlor-4-benzoylamino anthraquinone
1-chlor-5-methyl anthraquinone
1-chlor-4.5-dibenzoylamino anthraquinone
1-chlor-4-phenyl anthraquinone
1-chlor-4-methoxy anthraquinone
1-chlor-5-phenoxy anthraquinone and the like.

Where a 1.5-diamino anthraquinone is utilized for the condensation, the products which are obtained bear the first formula indicated above. Compounds depicted by the second formula result when 1.4-diamino anthraquinone is employed. The condensation is carried out by heating the various components to a temperature ranging from about 190 to 250° C. in the presence of an acid acceptor such as soda ash, sodium acetate, potassium carbonate and the like and copper or a salt of copper such as copper acetate and the like.

The ring closure is effected by heating the intermediate formed by the condensation reactions to a temperature of about 50 to 125° C. in the presence of an acid condensing agent. The acid condensing agent may be an acid such as concentrated sulfuric acid, chlorsulfonic acid or the like, but preferably is an acid-reacting metal chloride employed with a non-basic organic solvent. Suitable metal chlorides are: aluminum chloride, ferric chloride and the like. The non-basic organic solvents may be: nitrobenzene, nitrotoluene, dinitrobenzene, tetrachlorethane, chlorbenzene and the like.

The anthraquinone thioxanthone may be formed by reacting a 1-halogen or a 1-nitro anthraquinone-2-carboxylic acid with a phenyl mercaptan bearing the desired substituents in the 2- and 3-positions (corresponding to the 3'- and 4'-positions of the final product) and a halogen atom, preferably a chlorine atom, in the 5-position (corresponding to the 6'-position in the final product). The method of producing these compounds is specifically described in German Patent 243,750.

The manner in which the reaction proceeds when utilizing for example 3'.6'-chlor anthraquinone thioxanthone, 1.5-diamino anthraquinone and 1-chlor-5-benzoylamino anthraquinone is represented by the following equations:

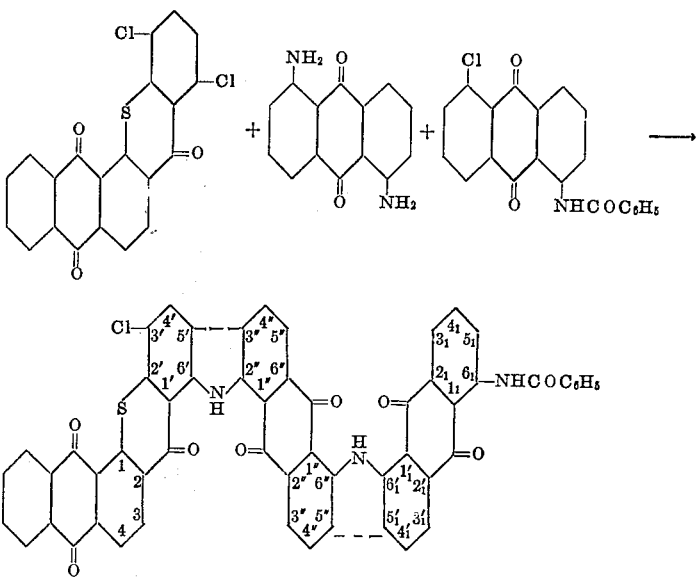

By suitable treatment of the intermediate indicated above, ring closure takes place along the dotted lines to form the desired end products.

The following are examples of compounds embraced by the above formulae and contemplated by the present invention. For the sake of brevity the nomenclature used indicates the particular substituents in the formulae noted.

1.
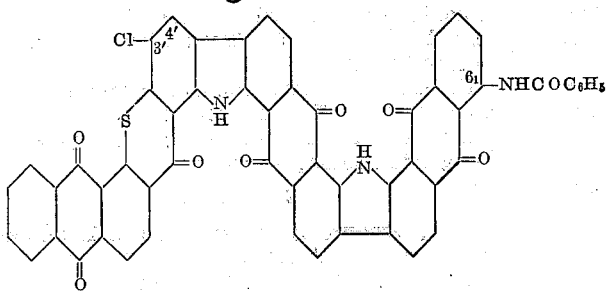

2.
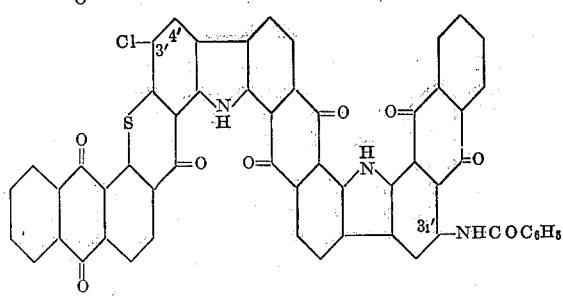

3. The compound is the same as that of Formula 1 excepting that the 3'-position is unsubstituted.

4. The compound is the same as that of Formula 1 excepting that the $6_1$ position is unsubstituted.

5. The compound is the same as that of Formula 1 excepting that the 3' and $6_1$ positions are unsubstituted.

6. The compound is the same as that of Formula 1 excepting that the 3'-position is substituted by methyl.

7. The compound is the same as that of Formula 1 excepting that the 3' and 4'-positions are substituted by chlorine.

8. The compound is the same as Formula 2 excepting that the 4'-position is substituted by phenyl.

9. The compound is the same as that of Formula 1 excepting that the $6_1$-position is substituted by p-methyl-benzoylamino.

10. The compound is the same as that of Formula 2 excepting that the $3_1$'-position is substituted by methyl.

11. The compound is the same as that of Formula 1 excepting that the 3' and 4'-positions are substituted by ethyl and the $6_1$-position is unsubstituted.

12. The compound is the same as that of Formula 1 excepting that the 3'-position is substituted by methoxy.

13. The compound is the same as that of Formula 2 excepting that the 3'-position is substituted by phenoxy.

14. The compound is the same as that of Formula 1 excepting that the 4'-position is substituted by ethoxy and the $6_1$-position is substituted by ethyl.

15. The compound is the same as that of Formula 1 except that the 3'-position is unsubstituted and the $6_1$ position is substituted by phenyl.

16. The compound is the same as that of Formula 2 excepting that the $3_1$' position is substituted by phenoxy.

17. The compound is the same as that of Formula 1 excepting that the 3'-position is substituted by propyl and the $6_1$-position is substituted by ethoxy.

18. The compound is the same as that of Formula 1 excepting that the $3_1$'-position is substituted by methyl.

19. The compound is the same as that of Formula 1 excepting that the $6_1$-position is substituted by p-methyl-benzoylamino.

20.

21.

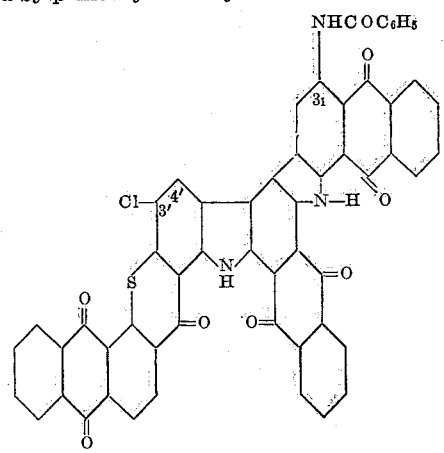

22. The compound is the same as that of Formula 20 excepting that the 3' and 4'-positions are substituted by chlorine.

23. The compound is the same as that of Formula 20 excepting that the $3_1$ and $6_1$'-positions are substituted by benzoylamino.

24. The compound is the same as that of Formula 21 excepting that the 4'-position is substituted by methoxy.

25. The compound is the same as that of Formula 20 excepting that the 3'-position is substituted by methyl.

26. The compound is the same as that of Formula 20 excepting that the 3'-position is substituted by phenoxy.

27. The compound is the same as that of Formula 21 with the exception that the 3'-position is substituted by phenyl.

28. The compound is the same as that of Formula 1 excepting that the 6₁'-position contains an amino group.

The following examples will serve to illustrate the invention, but it is to be understood that the same is not restricted thereto. The parts are by weight unless otherwise stated:

*Example I*

A mixture of 13.7 parts of anthraquinone-2,1-(S)-1',2' - (S) - 3',6' - dichlorothioxanthone, 7.6 parts of 1,5-diamino anthraquinone, 5.0 parts of soda ash, 1.0 part of copper acetate and 360 parts of nitrobenzene are heated for 4 hours at 205° C. Then 12.1 parts of 1-chloro - 5 - benzoylamino anthraquinone are added and the mixture is stirred for 15 hours at 205° C. After cooling to 70° C., the condensation product is isolated by filtration. The precipitate is washed successively with ethanol, dilute hydrochloric acid and water. The anthrimide dyes cotton violet shades from a violet vat.

For carbazolation 24.6 parts of the above anthrimide are dissolved at 60° C. in a solution of 60.0 parts of aluminum chloride in 240 cc. of nitrobenzene and stirred while heating at 90° C. for 1 hour. The color changes from green to greenish blue during the heating period. It is then poured into 1500 parts of ice water and 50 parts of 36% hydrochloric acid. The nitrobenzene is removed by steam distillation and the crude dyestuff filtered. Cotton is dyed by this product from a violet vat in strong neutral brown shades of very good fastness properties.

*Example II*

A mixture of 27.4 parts of anthraquinone-2,1-(S)-1',2'-(S) - 3',6' - dichlorothioxanthone, 15.2 parts of 1,5-diamino anthraquinone, 10.0 parts of soda ash, 2.0 parts of copper acetate and 730 parts of nitrobenzene are stirred at 205–210° C. for 4 hours. Then 12.1 parts of 1-chloro-4-benzaminoanthraquinone are added and stirring at the above temperature is continued for 15 hours. The anthrimide is worked up as in Example I. It dyes cotton violet-gray shades from a violet vat.

For carbazolation 29.2 parts of the anthrimide are added to a stirred solution of 60.0 parts of aluminum chloride in 240 parts of nitrobenzene. The temperature is raised to 90° C. and held for 45 minutes. At the end of the heating period the color has changed from green to olive brown. The dyestuff is worked up as in Example I. The finished dyestuff dyes cotton in powerful chocolate-brown shades and possesses excellent fastness properties.

*Example III*

A mixture of 13.7 parts of anthraquinone-2,1-(S) - 1'.2' - (S) - 3'.6'-dichloro thioxanthone, 7.6 parts of 1.4-diamino anthraquinone, 5 parts of soda ash, 1 part of copper acetate, 350 parts of nitrobenzene, are stirred at 205° C. for 4 hours. Then 12.1 parts of 1-chloro-5-benzoylamino anthraquinone are added and the mixture is stirred for 15 hours at 205° C. The anthrimide is worked up as in Example I.

The carbazolation is run as in Example I. The finished dyestuff dyes cotton brownish violet shades from a violet vat, the dyeings possessing very good fastness properties.

*Example IV*

The procedure is the same as in Example II excepting that 1.5-diamino anthraquinone is replaced by 1.4-diamino anthraquinone.

*Example V*

The procedure is the same as in Example I excepting that the anthraquinone-3'.6'-dichloro thioxanthone is replaced by anthraquinone-2.1-(S) - 1'.2' - (S) - 3' - phenoxy - 6' - chloro thioxanthone.

Various modifications of the invention will occur to persons skilled in the art. For instance, instead of preparing the dyestuffs in the manner indicated, they might also be prepared by first condensing a 5.5'-diamino-1.1'-dianthrimide carbazole with an anthraquinone-2.1-(S)-1'.2'-(S)-6'-chloro thioxanthone and carbazolizing the resulting anthrimide. If the compounds are to contain a benzoylamino group, the same may be introduced by benzoylating the free amino group. We therefore do not intend to be limited in the patent granted except as necessitated by the prior art and the appended claim.

We claim:

The compound of the formula:

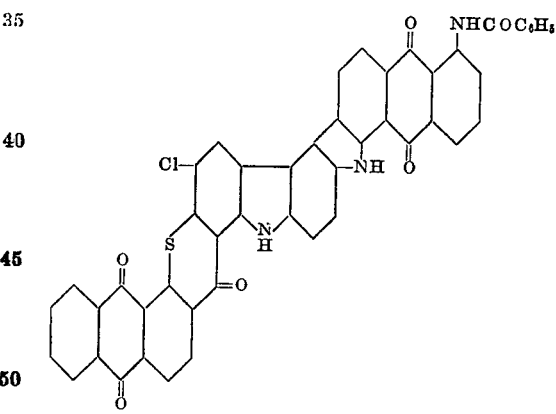

which dyes cotton from a hydrosulfite vat in brownish violet shades of excellent fastness properties.

FRITZ MAX.
DAVID I. RANDALL.

REFERENCES CITED

The following references are of record in the file of this patent:

UNITED STATES PATENTS

| Number | Name | Date |
|---|---|---|
| 2,212,965 | Wieners et al. | Aug. 27, 1940 |
| 2,238,209 | Bauer et al. | Apr. 15, 1941 |

OTHER REFERENCES

Fierz-David: "Kunstliche Organische Farbstoffe," Julius Springer, Berlin (1926), vol. 3, pages 603, 604.